United States Patent
Hosabettu et al.

(10) Patent No.: US 10,565,443 B2
(45) Date of Patent: Feb. 18, 2020

(54) METHOD AND SYSTEM FOR DETERMINING STRUCTURAL BLOCKS OF A DOCUMENT

(71) Applicant: Wipro Limited, Bangalore (IN)

(72) Inventors: Raghavendra Hosabettu, Bangalore (IN); Sneha Subhaschandra Banakar, Bengaluru (IN)

(73) Assignee: Wipro Limited, Bangalore (IN)

( * ) Notice: Subject to any disclaimer, the term of this patent is extended or adjusted under 35 U.S.C. 154(b) by 69 days.

(21) Appl. No.: 15/942,500

(22) Filed: Mar. 31, 2018

(65) Prior Publication Data
US 2019/0258854 A1 Aug. 22, 2019

(30) Foreign Application Priority Data

Feb. 16, 2018 (IN) .............................. 201841006073

(51) Int. Cl.
*G06K 9/00* (2006.01)
*G06K 9/66* (2006.01)

(52) U.S. Cl.
CPC .......... *G06K 9/00463* (2013.01); *G06K 9/66* (2013.01); *G06K 2209/01* (2013.01)

(58) Field of Classification Search
CPC .......... G06K 9/00449; G06K 9/00463; G06K 9/325; G06K 9/48; G06K 9/4609; G06T 7/0083; G06T 2207/10016; G06F 17/2735; G06F 17/271; G06F 17/2785; G11B 27/28
See application file for complete search history.

(56) References Cited

U.S. PATENT DOCUMENTS

| | | | | |
|---|---|---|---|---|
| 5,933,525 A * | 8/1999 | Makhoul | ............ | G06K 9/00879 382/185 |
| 6,335,986 B1 * | 1/2002 | Naoi | .................... | G06K 9/6807 382/190 |
| 6,501,856 B2 * | 12/2002 | Kuwano | ................ | G06K 9/325 348/E5.1 |
| 8,111,911 B2 * | 2/2012 | Khorsheed | ........... | G06K 9/4642 382/161 |

(Continued)

OTHER PUBLICATIONS

Lee & Ryu, "Parameter-Free Geometric Document Layout Analysis," IEEE Transactions on Pattern Analysis and Machine Intelligence 23(11):1240-1256 (2001).

(Continued)

*Primary Examiner* — Amir Alavi
(74) *Attorney, Agent, or Firm* — Pepper Hamilton LLP

(57) ABSTRACT

This disclosure relates generally to document processing, and more particularly to method and system for determining structural blocks of a document. In one embodiment, the method may include extracting text from the document, the text including text lines. The method may further include generating a feature vector for each of the text lines, the feature vector for the text line including a set of feature values for a set of corresponding features in the text line. The method may further include creating an input matrix for each of the text lines, the input matrix for the text line including a set of feature vectors corresponding to a set of neighboring text lines along with the text line. The method may further include determining a structural block tag for each of the text lines based on the corresponding input matrix using a machine learning model.

18 Claims, 13 Drawing Sheets

---

300

EXTRACT TEXT FROM A DOCUMENT, WHEREIN THE TEXT INCLUDES A PLURALITY OF TEXT LINES 301

GENERATE A FEATURE VECTOR FOR EACH OF THE PLURALITY OF TEXT LINES, WHEREIN THE FEATURE VECTOR FOR THE TEXT LINE INCLUDES A SET OF FEATURE VALUES FOR A SET OF CORRESPONDING FEATURES IN THE TEXT LINE 302

CREATE AN INPUT MATRIX FOR EACH OF THE PLURALITY OF TEXT LINES, WHEREIN THE INPUT MATRIX FOR THE TEXT LINE INCLUDES A SET OF FEATURE VECTORS CORRESPONDING TO A SET OF NEIGHBORING TEXT LINES ALONG WITH THE TEXT LINE 303

DETERMINE A STRUCTURAL BLOCK TAG FOR EACH OF THE PLURALITY OF TEXT LINES BASED ON THE CORRESPONDING INPUT MATRIX USING A MACHINE LEARNING MODEL 304

(56) References Cited

U.S. PATENT DOCUMENTS

| | | | | |
|---|---|---|---|---|
| 8,369,612 B2* | 2/2013 | Al-Omari | ............ | G06K 9/4642 |
| | | | | 382/161 |
| 8,391,602 B2* | 3/2013 | Chaki | ...................... | G06K 9/34 |
| | | | | 382/173 |
| 8,644,616 B2* | 2/2014 | Chaki | ...................... | G06K 9/34 |
| | | | | 382/177 |
| 9,501,708 B1* | 11/2016 | Ahmad | .............. | G06K 9/00879 |
| 10,242,257 B2* | 3/2019 | Hosabettu | .......... | G06K 9/00449 |
| 2015/0093033 A1* | 4/2015 | Kwon | ................ | G06K 9/00442 |
| | | | | 382/195 |
| 2018/0173696 A1* | 6/2018 | Hosabettu | .......... | G06F 17/2735 |

OTHER PUBLICATIONS

Sporleder & Lapata, "Automatic Paragraph Identification: A Study Across Languages and Domains," Proceedings of EMNLP, pp. 72-79 (2004), Retrieved from the Internet:<http://homepages.inf.ed.ac.uk/mlap/Papers/emnlp04.pdf>.

Klink & Kieninger, "Rule-Based Document Structure Understanding With a Fuzzy Combination of Layout and Textual Features," International Journal on Document Analysis and Recognition 4(1):18-26 (2001).

\* cited by examiner

```
                                                                      ─ 501
                                                                     ↙
┌─────────────────────────────────────────────────────────────────────────┐
│ Notes to the Financial Statements                                       │
│ for the Year Ended 31 December 2015                                     │
│                                                                         │
│ 1.   STATUTORY   INFORMATION                                            │
│      Arysta Lifescience  U.K. Holdings Limited is a private company,    │
│      limited by shares, and is incorporated and                         │
│      domiciled in England. The company's registered number and          │
│      registered office address can be found on the                      │
│      Company Information page.                                          │
│                                                                         │
│ 2.   STATEMENT   OF COMPLIANCE                                          │
│      These financial statements have been prepared in accordance with   │
│      United Kingdom Accounting Standards,                               │
│      including Financial Reporting Standard 102 "The Financial          │
│      Reporting Standard applicable in the UK and                        │
│      Republic of Ireland" and the Companies Act 2006.                   │
│                                                                         │
│ 3.   ACCOUNTING   POLICIES                                              │
│      The principal accounting policies applied in the preparation of    │
│      these financial statements are set out below.                      │
│      These policies have been consistently applied to all the years     │
│      presented, unless otherwise stated. The company                    │
│      has adopted FRS 102 in these financial statements. Details of the  │
│      transition to FRS 102 are disclosed in note 15.                    │
│                                                                         │
│      Basis of preparation                                               │
│      These financial statements are prepared on a going concern basis,  │
│      under the historical cost convention.                              │
└─────────────────────────────────────────────────────────────────────────┘
```

FIG. 5A

```
{       "filename":
"ARYSTA_LIFESCIENCE_U.K._HOLDINGS_LIMITED_ANNUAL_FILINGS_text_complete.json",
        "trainings": [ {       "tokens": [["Notes to the Financial Statements", 41], ["for the Year Ended 31 December
2015", 75], ["1. STATUTORY INFORMATION", 111], ["Arysta Lifescience U.K. Holdings Limited is a private
company, limited by shares, and is incorporated and", 136], ... ["Basis of preparation", 1007], ["These financial
statements are prepared on a going concern basis, under the historical cost convention.", 1028]],
                "text": "Notes to the Financial Statements for the Year Ended 31 December 2015 1.
STATUTORY INFORMATION Arysta Lifescience U.K. Holdings Limited is a private company, limited by shares, ...
These financial statements are prepared on a going concern basis, under the historical cost convention. ",
                "id": "Page 11",
                "tags": [{       "start": 1,
                                "end": 3,
                                "tag": "sec_header"
                        },
                        {       "start": 3,
                                "end": 4,
                                "tag": "sec_header"
                        },
                        {       "start": 4,
                                "end": 5,
                                "tag": "para_start"
                        },
                        {       "start": 5,
                                "end": 6,
                                "tag": "para"
                        },
                        {       "start": 6,
                                "end": 7,
                                "tag": "para_end"
                        },
                        {       "start": 7,
                                "end": 8,
                                "tag": "sec_header"
                        },
                        {       "start": 8,
                                "end": 9,
                                .
                                .
                                .
                                "tag": "sec_header"
                        },
                        {       "start": 16,
                                "end": 17,
                                "tag": "single_line"
                        }
                ]
        }
    ]
}
```

FIG. 5B

```
[{
        "Notes to the Financial Statements ":
"3,65.0,90.0,10.942760942760943,10.70154577883472,184.921875,31.13162878787879,841.0,594.0,11"
    }, {
        "for the Year Ended 31 December 2015 ":
"3,65.0,100.0,10.942760942760943,11.890606420927467,204.2890625,34.392098063973066,841.0,594.0,11"
    }, {
        "1. STATUTORY INFORMATION ":
"3,66.0,121.0,11.111111111111111,14.387633769322235,200.59765625,33.7706492003367,841.0,594.0,11"
    }, {
        "Arysta Lifescience U.K. Holdings Limited is a private company, limited by shares, and is incorporated and ":
"3,93.0,132.0,15.656565656565656,15.695600475624257,510.37109375,85.92105955387206,841.0,594.0,11"
    }, {
        "domiciled in England. The company's registered number and registered office address can be found on the ":
"2,94.0,143.0,15.824915824915825,17.00356718192628,511.12109375,86.04732218013469,841.0,594.0,11"
    }, {
        "Company Information page. ":
"2,94.0,153.0,15.824915824915825,18.192627824019024,195.2109375,32.86379419191919,841.0,594.0,11"
    }, {
        "2. STATEMENT OF COMPLIANCE ":
"3,65.0,175.0,10.942760942760943,20.808561236623067,212.609375,35.792824074074076,841.0,594.0,11"
    }, {
        "These ?nancial statements have been prepared in accordance with United Kingdom Accounting Standards, ":
"3,93.0,185.0,15.656565656565656,21.997621878715815,511.57421875,86.12360585016835,841.0,594.0,11"
    }, ... {
        "Basis of preparation ":
"3,94.0,281.0,15.824915824915825,33.41260404280618,164.40625,27.677819865319865,841.0,594.0,11"
    }, {
        "These financial statements are prepared on a going concern basis, under the historical cost convention. ":
"2,94.0,291.0,15.824915824915825,34.60166468489893,471.27734375,79.33962015993266,841.0,594.0,11"
    }
]
```

FIG. 5C

```
[... { "for the Year Ended 31 December 2015 ": [   "--------vector of last but one line from previous page---------",
                                                   "--------vector of last line from previous page---------",
       "3,65.0,90.0,10.942760942760943,10.70154577883472,184.921875,31.13162878787879,841.0,594.0,11",
       "3,65.0,100.0,10.942760942760943,11.890606420927467,204.2890625,34.392098063973066,841.0,594.0,11",
       "3,66.0,121.0,11.111111111111111,14.387633769322235,200.59765625,33.7706492003367,841.0,594.0,11",
       "3,93.0,132.0,15.656565656565656,15.695600475624257,510.37109375,85.92105955387206,841.0,594.0,11",
       "2,94.0,143.0,15.824915824915825,17.00356718192628,511.12109375,86.04732218013469,841.0,594.0,11" ]
},
{ "1. STATUTORY INFORMATION ": [   "--------vector of last line from previous page---------",
       "3,65.0,90.0,10.942760942760943,10.70154577883472,184.921875,31.13162878787879,841.0,594.0,11",
       "3,65.0,100.0,10.942760942760943,11.890606420927467,204.2890625,34.392098063973066,841.0,594.0,11",
       "3,66.0,121.0,11.111111111111111,14.387633769322235,200.59765625,33.7706492003367,841.0,594.0,11",
       "3,93.0,132.0,15.656565656565656,15.695600475624257,510.37109375,85.92105955387206,841.0,594.0,11",
       "2,94.0,143.0,15.824915824915825,17.00356718192628,511.12109375,86.04732218013469,841.0,594.0,11",
       "2,94.0,153.0,15.824915824915825,18.192627824019024,195.2109375,32.86379419191919,841.0,594.0,11" ]
},
{ "Arysta Lifescience U.K. Holdings Limited is a private company, limited by shares, and is incorporated and ": [
       "3,65.0,90.0,10.942760942760943,10.70154577883472,184.921875,31.13162878787879,841.0,594.0,11",
       "3,65.0,100.0,10.942760942760943,11.890606420927467,204.2890625,34.392098063973066,841.0,594.0,11",
       "3,66.0,121.0,11.111111111111111,14.387633769322235,200.59765625,33.7706492003367,841.0,594.0,11",
       "3,93.0,132.0,15.656565656565656,15.695600475624257,510.37109375,85.92105955387206,841.0,594.0,11",
       "2,94.0,143.0,15.824915824915825,17.00356718192628,511.12109375,86.04732218013469,841.0,594.0,11",
       "2,94.0,153.0,15.824915824915825,18.192627824019024,195.2109375,32.86379419191919,841.0,594.0,11",
       "3,65.0,175.0,10.942760942760943,20.808561236623067,212.609375,35.792824074074076,841.0,594.0,11" ]
},
{

.
.
.

},
{ "Basis of preparation ": [
       "2,94.0,238.0,15.824915824915825,28.299643281807374,511.89453125,86.17753051346801,841.0,594.0,11",
       "2,94.0,249.0,15.824915824915825,29.607609988109395,509.25,85.73232323232324,841.0,594.0,11",
       "2,94.0,259.0,15.824915824915825,30.79667063020214,509.859375,85.83491161616162,841.0,594.0,11",
       "3,94.0,281.0,15.824915824915825,33.41260404280618,164.40625,27.677819865319865,841.0,594.0,11",
       "2,94.0,291.0,15.824915824915825,34.60166468489893,471.27734375,79.33962015993266,841.0,594.0,11",
                    "--------vector of first line from the next page---------",
                    "--------vector of second line from the next page---------" ]
},
{ "These financial statements are prepared on a going concern basis, under the historical cost convention. ": [
       "2,94.0,249.0,15.824915824915825,29.607609988109395,509.25,85.73232323232324,841.0,594.0,11",
       "2,94.0,259.0,15.824915824915825,30.79667063020214,509.859375,85.83491161616162,841.0,594.0,11",
       "3,94.0,281.0,15.824915824915825,33.41260404280618,164.40625,27.677819865319865,841.0,594.0,11",
       "2,94.0,291.0,15.824915824915825,34.60166468489893,471.27734375,79.33962015993266,841.0,594.0,11",
                    "--------vector of first line from the next page---------",
                    "--------vector of second line from the next page---------",
                    "--------vector of third line from the next page---------" ]
    }
]
```

FIG. 5D

```
[{ "CATERPILLAR UK HOLDINGS LIMITED ":
"0,219.0,61.0,36.86868686868687,7.253269916765755,351.81640625,59.22835122053872,841.0,594.0,5" },
{ "DIRECTORS\u2018 REPORT ":
"0,258.0,96.0,43.43434343434343,11.414982164090368,331.4453125,55.798874158249156,841.0,594.0,5" },
{ "FOR THE YEAR ENDED 31 DECEMBER 2015 ":
"0,207.0,107.0,34.84848484848485,12.72294887039239,357.8046875,60.236479377104374,841.0,594.0,5" },
{
...
...
...
{ "QUALIFYING THIRD PARTY INDEMNITY PROVISIONS ":
"3,62.0,641.0,10.437710437710438,76.21878715814506,302.1806640625,50.87216566708754,841.0,594.0,5" },
{ "At the time this report is approved and during the financial year, a qualifying third party indemnity provision was in ": "3,62.0,664.0,10.437710437710438,78.95362663495838,457.0546875,76.94523358585859,841.0,594.0,5" },
{ "place for the benefit of one or more of the directors. ":
"2,62.0,675.0,10.437710437710438,80.26159334126041,237.953125,40.05944865319865,841.0,594.0,5" },
{ "Page 2 ":
"1,527.0,811.0,88.72053872053873,96.43281807372176,549.49609375,92.50775989057239,841.0,594.0,5" }
]
```
— 602

FIG. 6B

```
[ ...
    ...
    { "The directors present their report and the audited financial statements for the year ended 31 December 2015" [
"2,63.0,132.0,10.606060606060606,15.695600475624257,435.734375,73.35595538720538,841.0,594.0,5",
"0,258.0,96.0,43.43434343434343,11.414982164090368,331.4453125,55.798874158249156,841.0,594.0,5",
"0,207.0,107.0,34.84848484848485,12.72294887039239,357.8046875,60.236479377104374,841.0,594.0,5",
"2,63.0,132.0,10.606060606060606,15.695600475624257,435.734375,73.35595538720538,841.0,594.0,5",
"3,63.0,154.0,10.606060606060606,18.3115338882283,116.759765625,19.656526199494948,841.0,594.0,5",
"2,63.0,177.0,10.606060606060606,21.046373365041617,407.52734375,68.60729692760943,841.0,594.0,5",
"3,63.0,198.0,10.606060606060606,23.543400713436384,95.6953125,16.11032196969697,841.0,594.0,5" ]
    },
    { "DIRECTORS ": [
"0,258.0,96.0,43.43434343434343,11.414982164090368,331.4453125,55.798874158249156,841.0,594.0,5",
"0,207.0,107.0,34.84848484848485,12.72294887039239,357.8046875,60.236479377104374,841.0,594.0,5",
"2,63.0,132.0,10.606060606060606,15.695600475624257,435.734375,73.35595538720538,841.0,594.0,5",
"3,63.0,154.0,10.606060606060606,18.3115338882283,116.759765625,19.656526199494948,841.0,594.0,5",
"2,63.0,177.0,10.606060606060606,21.046373365041617,407.52734375,68.60729692760943,841.0,594.0,5",
"3,63.0,198.0,10.606060606060606,23.543400713436384,95.6953125,16.11032196969697,841.0,594.0,5",
"3,63.0,209.0,10.606060606060606,24.851367419738406,110.81640625,18.65596064814815,841.0,594.0,5" ]
    },
    {
    ...
    ...
    ...
    { "QUALIFYING THIRD PARTY INDEMNITY PROVISIONS ": [
"2,62.0,539.0,10.437710437710438,64.09036860879905,419.18359375,70.56962857744108,841.0,594.0,5",
"3,62.0,573.0,10.437710437710438,68.13317479191439,178.1181640625,29.986222906144782,841.0,594.0,5",
"2,62.0,596.0,10.437710437710438,70.8680142687277,398.5703125,67.09937920875421,841.0,594.0,5",
"3,62.0,641.0,10.437710437710438,76.21878715814506,302.1806640625,50.87216566708754,841.0,594.0,5",
"3,62.0,664.0,10.437710437710438,78.95362663495838,457.0546875,76.94523358585859,841.0,594.0,5",
"2,62.0,675.0,10.437710437710438,80.26159334126041,237.953125,40.05944865319865,841.0,594.0,5",
"1,527.0,811.0,88.72053872053873,96.43281807372176,549.49609375,92.50775989057239,841.0,594.0,5\t"]
    },
    ...
    ...
    { "Page 2 ": [
"3,62.0,641.0,10.437710437710438,76.21878715814506,302.1806640625,50.87216566708754,841.0,594.0,5",
"3,62.0,664.0,10.437710437710438,78.95362663495838,457.0546875,76.94523358585859,841.0,594.0,5",
"2,62.0,675.0,10.437710437710438,80.26159334126041,237.953125,40.05944865319865,841.0,594.0,5",
"1,527.0,811.0,88.72053872053873,96.43281807372176,549.49609375,92.50775989057239,841.0,594.0,5\t",
            ""
            ""
            ""]
    }
]
```

METHOD AND SYSTEM FOR DETERMINING STRUCTURAL BLOCKS OF A DOCUMENT

This application claims the benefit of Indian Patent Application Serial No. 201841006073 filed Feb. 16, 2018, which is hereby incorporated by reference in its entirety.

FIELD

This disclosure relates generally to document processing, and more particularly to method and system for determining structural blocks of a document.

BACKGROUND

A wide variety of applications may require processing of documents to perform contextual data interpretation. As will be appreciated, document processing may typically involve conversion of a paper or electronic document into electronic information (that is, data) that may be worked upon. Further, as will be appreciated, for any document processing technique, an important task may be extraction of a structure of the document. A knowledge of logical structure of the document may help in accurate extraction of data. A logical layout structure may include the classification of the structural blocks of the document into headers, footers, title, paragraphs, section headers, footnotes, references, table of content, and the like.

However, the documents generally do not follow a standardized structure, thereby making extraction of data from the documents a challenging task. For example, portable document format (PDF) is one of the most common formats for documents today. Though the PDF format is optimized for presentation, it typically lacks structural information. Further, there may be different application programming interfaces (APIs) and encoding techniques used to build a PDF document. Thus, when a program wants to extract structural information, there are no standard tags or properties based on which various sections or structural blocks of document may be identified. In any large-scale application, the document processing techniques may have to cope with a large number of variations in layout of the documents and the problem may be further amplified.

Existing techniques for identification of structural blocks within the documents scope are limited in their scope, utility, and application. For example, one of the existing techniques provide for segmenting the document images into maximal homogenous regions and identifying them as such as texts, images, tables, and ruling lines. Though this technique is useful to segment blocks of document as images, texts, tables, actual structure of the text content may not be determined. In particular, the text content may not be differentiated into paragraphs, title, footnotes, and the like. Another existing technique provides for identification of paragraphs automatically in different languages and domains. However, this technique provides for identification of only paragraphs within the document. One of the other existing techniques provide for a rule-based approach for understanding structure of the document. The technique further provides for an exchangeable rule base adaptable to several domains. However, a rule based approach may work well only when the layout of the document is consistent, but may fail for a set of documents with large variations. Further, for an image document (for example, a scanned document) that has been converted to text using optical text recognition tool, a lot of the features like font, spacing, and the like may be lost, thereby leading to a failure of rule based techniques.

SUMMARY

In one embodiment, a method for determining structural blocks of a document is disclosed. In one example, the method may include extracting text from the document, the text including a plurality of text lines. The method may further include generating a feature vector for each of the plurality of text lines, the feature vector for the text line including a set of feature values for a set of corresponding features in the text line. The method may further include creating an input matrix for each of the plurality of text lines, the input matrix for the text line including a set of feature vectors corresponding to a set of neighboring text lines along with the text line. The method may further include determining a structural block tag for each of the plurality of text lines based on the corresponding input matrix using a machine learning model.

In one embodiment, a system for determining structural blocks of a document is disclosed. In one example, the system may include at least one processor and a memory communicatively coupled to the at least one processor. The memory may store processor-executable instructions, which, on execution, may cause the processor to extract text from the document, the text including a plurality of text lines. The processor-executable instructions, on execution, may further cause the processor to generate a feature vector for each of the plurality of text lines, the feature vector for the text line including a set of feature values for a set of corresponding features in the text line. The processor-executable instructions, on execution, may further cause the processor to create an input matrix for each of the plurality of text lines, the input matrix for the text line including a set of feature vectors corresponding to a set of neighboring text lines along with the text line. The processor-executable instructions, on execution, may further cause the processor to determine a structural block tag for each of the plurality of text lines based on the corresponding input matrix using a machine learning model.

In one embodiment, a non-transitory computer-readable medium storing computer-executable instructions for determining structural blocks of a document is disclosed. In one example, the stored instructions, when executed by a processor, may cause the processor to perform operations including extracting text from the document, the text including a plurality of text lines. The operations may further include generating a feature vector for each of the plurality of text lines, the feature vector for the text line including a set of feature values for a set of corresponding features in the text line. The operations may further include creating an input matrix for each of the plurality of text lines, the input matrix for the text line including a set of feature vectors corresponding to a set of neighboring text lines along with the text line. The operations may further include determining a structural block tag for each of the plurality of text lines based on the corresponding input matrix using a machine learning model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 5A-5E is an exemplary implementation of techniques for preparing a training data for training a machine learning model, in accordance with some embodiments of the present disclosure;

FIGS. 6A-6D is an exemplary implementation of techniques for determining structural blocks of a document using a trained machine learning model, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
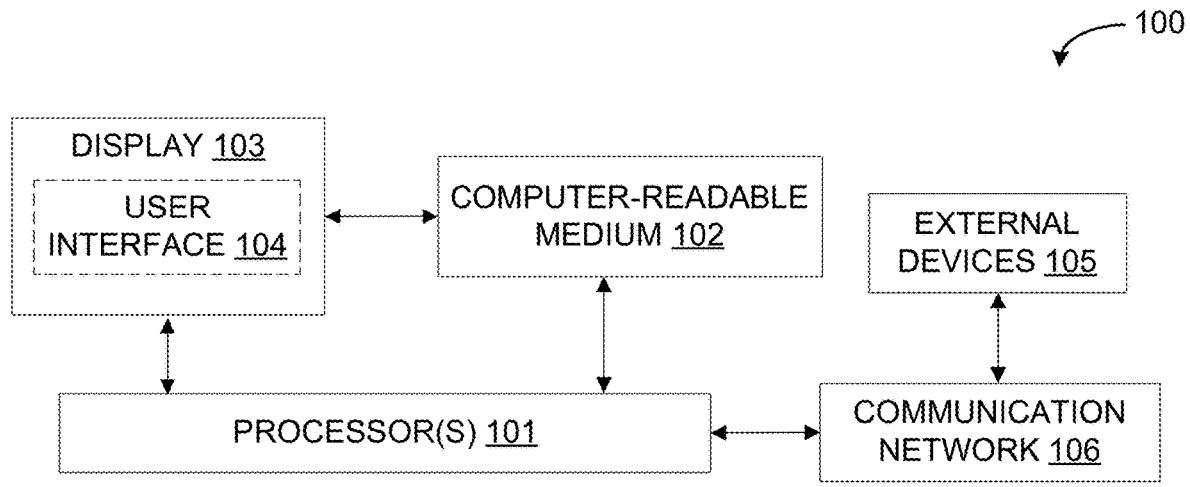
FIG. 1 is a block diagram of an exemplary system for determining structural blocks of a document in accordance with some embodiments of the present disclosure.

Referring now to FIG. 1, an exemplary system 100 for determining structural blocks of a document is illustrated in accordance with some embodiments of the present disclosure. In particular, the system 100 may include a document analysis device (for example, server, desktop, laptop, notebook, netbook, tablet, smartphone, mobile phone, or any other computing device) that implements a structural blocks detection and annotation engine so as to determine structural blocks of the document. It should be noted that, in some embodiments, the structural blocks detection and annotation engine may extract the determined structural blocks or annotate the document with the determined structural blocks. As will be described in greater detail in conjunction with FIGS. 2-6, the structural blocks detection and annotation engine may extract text from the document. The text may include a number of text lines. The structural blocks detection and annotation engine may then generate a feature vector for each of the text lines. The feature vector for a text line may include a set of feature values for a set of corresponding features in the text line. The structural blocks detection and annotation engine may then create an input matrix for each of the text lines. The input matrix for the text line may include a set of feature vectors corresponding to a set of neighboring text lines along with the text line. The structural blocks detection and annotation engine may then determine a structural block tag for each of the text lines based on the corresponding input matrix using a machine learning model.

The system 100 may include one or more processors 101, a computer-readable medium (for example, a memory) 102, and a display 103. The computer-readable storage medium 102 may store instructions that, when executed by the one or more processors 101, cause the one or more processors 101 to determine structural blocks of a document in accordance with aspects of the present disclosure. The computer-readable storage medium 102 may also store various data (for example, documents, extracted text, text lines, features, feature values, feature vector, input matrix, machine learning model, structural block tags, training data, and the like) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but may not be limited to, a remote server, a digital device, or another computing system.

Figure 2:
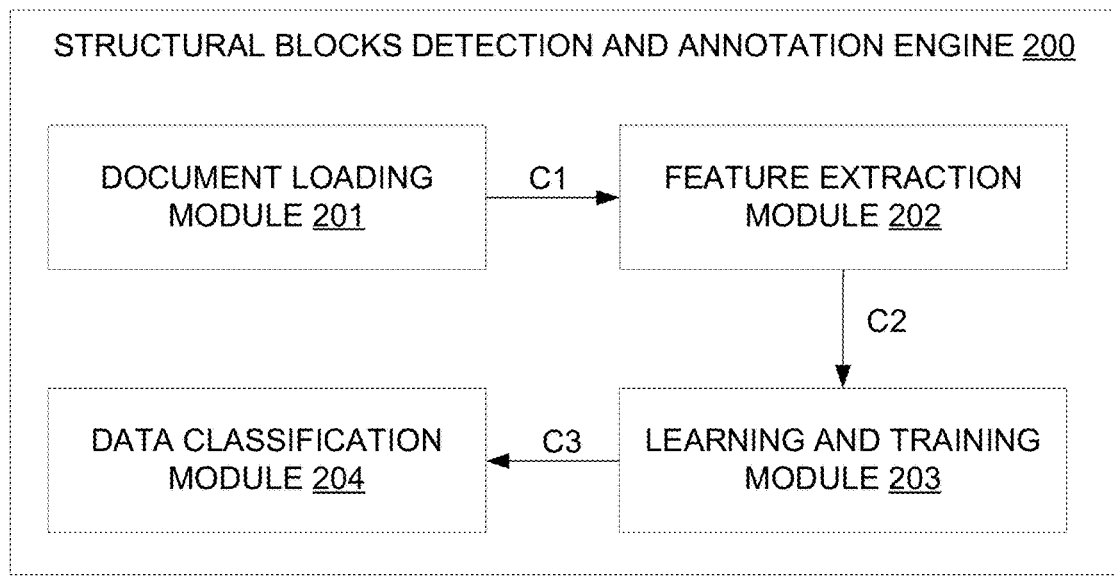
FIG. 2 is a functional block diagram of a structural blocks detection and annotation engine in accordance with some embodiments of the present disclosure.

Referring now to FIG. 2, a functional block diagram of a structural blocks detection and annotation engine 200, implemented by the system 100 of FIG. 1, is illustrated in accordance with some embodiments of the present disclosure. The structural blocks detection and annotation engine 200 may include various modules that perform various functions so as to determine structural blocks of a document and to extract or annotate the determined structural blocks. In some embodiments, the structural blocks detection and annotation engine 200 may include a document loading module 201, a feature extraction module 202, a learning and training module 203, and a data classification module 204. As will be appreciated by those skilled in the art, all such aforementioned modules 201-204 may be represented as a single module or a combination of different modules. Moreover, as will be appreciated by those skilled in the art, each of the modules 201-204 may reside, in whole or in parts, on one device or multiple devices in communication with each other.

The document loading module 201 may receive a document that needs to be processed by the structural blocks detection and annotation engine 200 from one or more sources. For example, in some embodiments, the document loading module 201 may receive the document directly from an input device (for example, scanner, camera, and the like) or an external device (for example, smartphone, and the like). Additionally, in some embodiments, the document loading module 201 may receive the document uploaded by a user via the user interface. The document may be in any unstructured format (that is, the structural blocks may not be defined in the document). For example, the document may be an unstructured image document or an unstructured text document. The unstructured image document may include, but may not be limited to, a portable document format (.pdf), a joint photographic experts group format (.jpg or jpeg), a tagged image file format (.tiff or .tif), a bitmap image file format (.bmp), a graphics interchange format (.gif), and a PNG format (.png). Further, in case of image documents, the document loading module 201 may perform an optical text recognition on the received image document to generate the unstructured text document. As will be appreciated, the unstructured text document may be required for subsequent processing by other modules 202-204 for correction and analysis of structural information in its data content.

The feature extraction module 202 may receive the unstructured text document from the document loading module 201 via a C1 interface using standard wired or wireless data transfer protocols. The feature extraction module 202 may then generate a set of feature values corresponding to a set of features in each of the text lines in the unstructured text document. The features may include, but may not be limited to, a positional feature, a font feature, a count feature, a spacing feature, and a semantic feature. The feature values may include, but may not be limited to, positional coordinates of the text line, a font size in the text line, a font weight in the text line, a font relative weight in the text line, one or more flags for one or more font styles, and a length of the text line. As will be appreciated, the feature values may be based on details of the features (for example, spacing, font details, width, height, and the like) and may be derived using any standard document reader library. Thus, all the features in a text line may have numeric feature values. The feature values for a given text line may then be used to generate a feature vector for the text line.

The learning and training module 203 may receive unstructured text document along with the feature vectors for each of the text lines in the unstructured text document from the features extraction module 202 via a C2 interface using standard wired or wireless data transfer protocols. The feature extraction module 202 may then create a training data by tagging each of the text lines to various structural block classes based on the document property information extracted, by the feature extraction module 202, from multiple documents covering required class variations. The structural block classes may include, but may not be limited to, a paragraph, a footnote, a paragraph start, a single line, a paragraph end, a section header, a list, a table of content, and a title. In some embodiments, the learning and training module 203 may filter out a header, a footer, or a table line from the training data. Further, the learning and training module 203 may create an input matrix for each of the text lines. The input matrix for a text line may include a set of feature vectors corresponding to the text line and a set of neighboring text lines. In some embodiments, the set of neighboring text lines may include a pre-defined set of preceding text lines and a pre-defined set of successive text lines. For example, if the input matrix includes 7 feature vectors for each text line (that is, window size as 7), then the feature vectors for preceding 3 text lines, a given text line, and the succeeding 3 text lines may be combined to form the input matrix for the given text line.

Upon creating the training data, the learning and training module 203 may perform training of a machine learning model using the training data. The patterns and structural context of the document may be learnt using the machine learning model. In some embodiments, the machine learning model may be a sequence to sequence machine learning model. For example, the machine learning model may be a combination of position invariant sequence to sequence neural networks. Further, for example, the machine learning model may be a recurrent convolutional neural network (RCNN). The sequence to sequence machine learning model may learn patterns across the space (position independent) and classify the text lines in a document. In other words, the preceding and successive lines may help the machine learning model in deciding the class for each input text line. As will be appreciated, such position independent classification is desirable to know the structural context of the document.

The data classification module 204 may receive the trained machine learning model (that is, the learned relationship) from the learning and training module 203 via a C3 interface using standard wired or wireless data transfer protocols. The data classification module 204 may then employ the trained machine learning model to determine and extract structural block tag for each of the text lines based on the corresponding input matrix. Thus, once the machine learning model is built and trained, the same may be employed by the data classification module 204 to automatically detect and extract structural blocks of an input document so as to identify contextual text for the input document.

By way of example, the structural blocks detection and annotation engine 200 may load the documents. The structural blocks detection and annotation engine 200 may then read or parse all the document structural data from the input documents and may further analyze the same for extraction. The structural blocks detection and annotation engine 200 may further extract the contextual text features (structural information and text characteristics) of the document using context aware and position independent text extraction techniques. Additionally, the structural blocks detection and annotation engine 200 may generate various feature values corresponding to the extracted text from the document and may classify the same. Further, the structural blocks detection and annotation engine 200 may train the classification model (sequence-to-sequence machine learning network, and position independent neural network) using training data for variations observed over time, and may update the learning. Moreover, the structural blocks detection and annotation engine 200 may identify the contextual data from documents for various applications.

It should be noted that the structural blocks detection and annotation engine 200 may be implemented in programmable hardware devices such as programmable gate arrays, programmable array logic, programmable logic devices, and so forth. Alternatively, the structural blocks detection and annotation engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for determining structural blocks of a document. For example, the exemplary system 100 and the associated structural blocks detection and annotation engine 200 may determine structural blocks of a document by the processes discussed herein. In particular, as will be appreciated by those of ordinary skill in the art, control logic and/or automated routines for performing the techniques and steps described herein may be implemented by the system 100 and the structural blocks detection and annotation engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
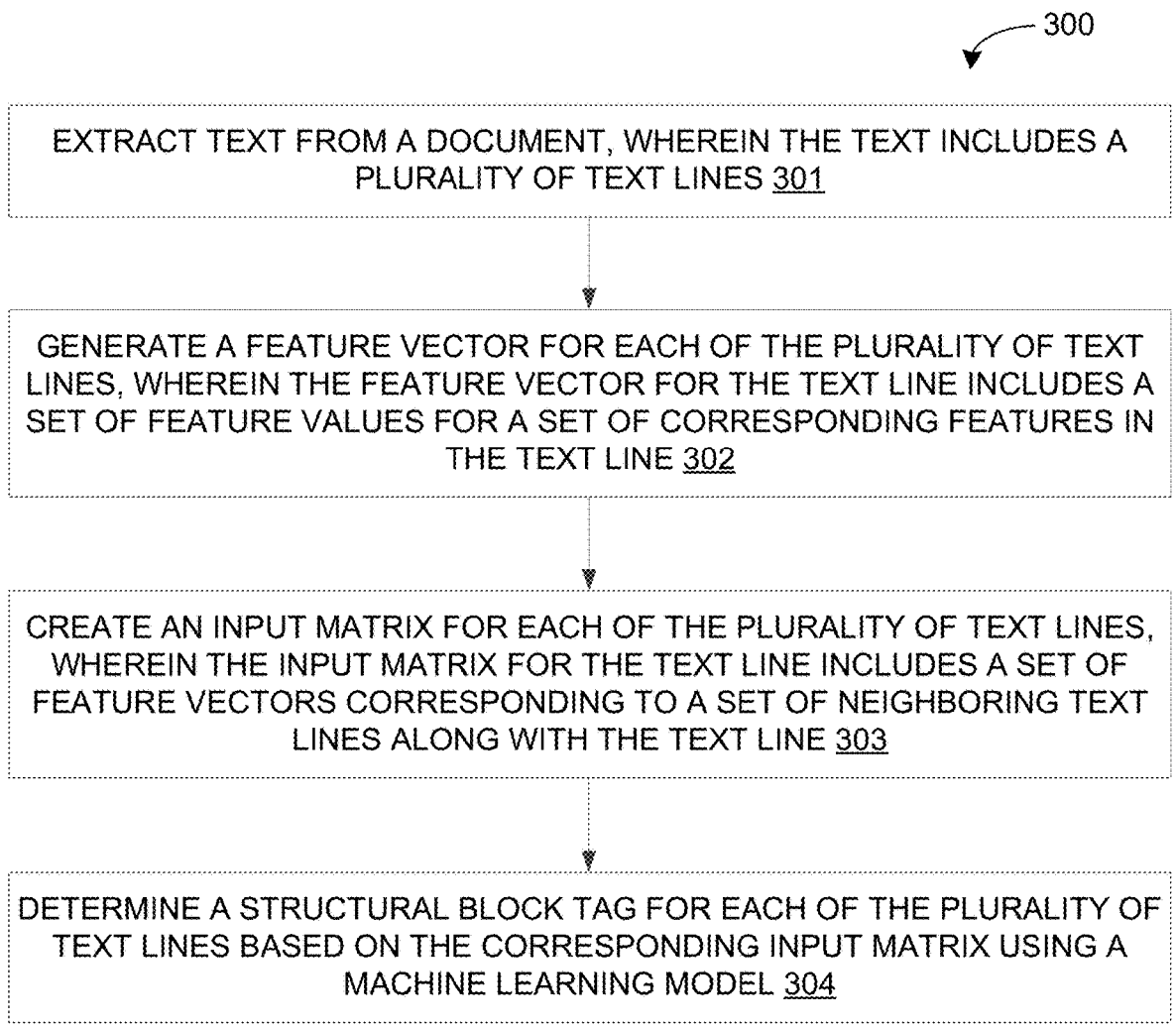
FIG. 3 is a flow diagram of an exemplary process for determining structural blocks of a document in accordance with some embodiments of the present disclosure.

For example, referring now to FIG. 3, exemplary control logic 300 for determining structural blocks of a document via a system, such as the system 100, is depicted via a flowchart in accordance with some embodiments of the present disclosure. As illustrated in the flowchart, the control logic 300 may include the step of extracting text from the document at step 301. It should be noted that the text may include a plurality of text lines. The control logic 300 may further include the step of generating a feature vector for each of the plurality of text lines at step 302. The feature vector for the text line may include a set of feature values for a set of corresponding features in the text line. The control logic 300 may further include the step of creating an input matrix for each of the plurality of text lines at step 303. The input matrix for the text line may include a set of feature vectors corresponding to a set of neighboring text lines along with the text line. Further, the control logic 300 may include the step of determining a structural block tag for each of the plurality of text lines based on the corresponding input matrix using a machine learning model at step 304.

In some embodiments, the control logic 300 may further include the steps of receiving an image document, and performing an optical text recognition on the image document to generate the document. Additionally, in some embodiments, the control logic 300 may further include the step of training the machine learning model with training data. It should be noted that, in some embodiments, the training data may include a set of texts extracted from a set of documents, and, for each of the set of texts, a set of text lines with a corresponding set of feature vectors and a corresponding set of pre-defined structural block tags.

In some embodiments, extracting the text at step 301 may include the step of applying a text extraction tool with a pre-defined or a dynamic threshold on the document so as to extract the plurality of text lines from the document. Further, in some embodiments, extracting the text at step 301 may include filtering at least one of a header, a footer, or a table line.

In some embodiments, the set of corresponding features may include at least one of a positional feature, a font feature, a count feature, a spacing feature, or a semantic feature. Further, in some embodiments, the feature value for the corresponding feature may include at least one of positional coordinates of the text line, a font size in the text line, a font weight in the text line, a font relative weight in the text line, one or more flags for one or more font styles, or a length of the text line.

In some embodiments, the set of neighboring text lines comprises a pre-defined set of preceding text lines and a pre-defined set of successive text lines. Additionally, in some embodiments, the machine learning model is a sequence to sequence machine learning model. Further, in some embodiments, the structural block tag may include paragraph tag or a non-paragraph tag. The paragraph tag may include one of a footnote tag, a paragraph start tag, a single line tag, or a paragraph tag. Similarly, the non-paragraph tag may include one of a section header tag, a list tag, a table of content tag, a title tag, or an un-classified tag.

Figure 4:
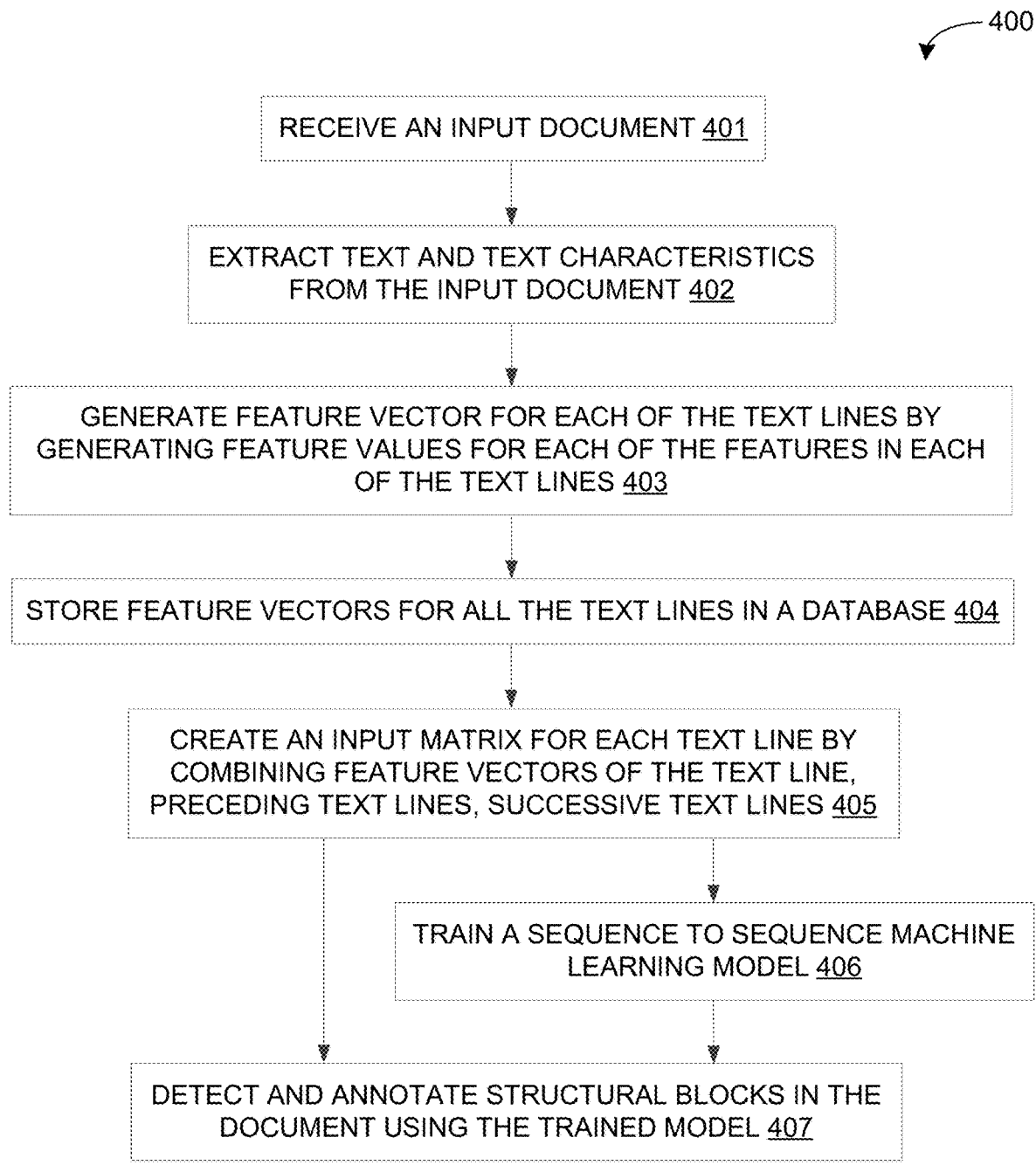
FIG. 4 is a flow diagram of a detailed exemplary process for determining structural blocks of a document in accordance with some embodiments of the present disclosure.

Referring now to FIG. 4, exemplary control logic 400 for determining structural blocks of a document is depicted in greater detail via a flowchart in accordance with some embodiments of the present disclosure. As illustrated in the flowchart, at step 401, the control logic 400 may receive an input document to be processed for structural blocks identification so as to derive for contextual text. For example, a financial reports of a company may be loaded for risk assessment.

At step 402, the control logic 400 may extract text and text characteristics from the input document. The text information from the input document may be extracted using a text extractor tool or library. It should be noted that the text extraction tools may not provide complete information of the text present in the input document. As will be appreciated, in some embodiments, the formation of lines and words in the extracted text may be incorrect. For example, the superscript and subscript in a line may be considered as a different text line. Hence, the control logic 400 may apply predefined or dynamic thresholds so as to extract word and text line boundaries. Further, it should be noted that if the input document is an image file (that is, image document), it may need to be converted to a text document before extracting text lines and words.

Further, in some embodiments, the training data may be prepared by filtering out some of the sections of the text document. For example, at least one of a header, a footer, or a table line may be filtered out of the training data. Headers and Footers may be typically detected by page association. In other words, headers and footers may be detected more accurately when text lines in header and footer sections are compared with text lines in header and footer sections of other pages rather than when compared with just their neighboring text lines, and they need page context. Hence, headers and footers may be filtered out from the training data. Further, in some embodiments, the table lines may typically require the spacing features and the positional features of the words, may, therefore, be filtered out from the training data.

At step 403, the control logic 400 may generate feature vector for each of the text lines by generating feature values for each of the features in each of the text line. Thus, a feature value may be generated for a corresponding feature in each of the text lines in the document. In some embodiments, the features may include, but may not be limited to, a positional feature (for example, co-ordinates for words, lines, page number, and the like), a font feature (for example, font size, font style, font color, and the like), a count feature (for example, number of words per line, number of characters per line, and the like), a spacing feature (that is, in comparison with neighboring lines), and a semantic feature (for example, POS tags for words in a line). The feature values may include, but are not limited to, positional coordinates of the text line, a font size in the text line, a font weight in the text line, a font relative weight in the text line, one or more flags (for example, '0' or '1') for one or more font styles (for example, bold, italics, underline, and the like), a font color in the text line, and a length of the text line. As stated above, the feature values may be based on details of the features (for example, spacing, font details, width, height, and the like) and may be derived using any standard document reader library. Thus, all the features in a text line may have numeric feature values.

As will be appreciated, the font details may help in detecting various structural blocks like section headers, title, and the like, as they may be typically written in bigger font or different font from the paragraph text. Even for footnote, the font properties may be a major differentiator. Also, the width and number of words in the text line may contribute in identifying the non-paragraph text lines as they will have probably lesser words and width than the paragraph text lines. The color feature may also contribute majorly in identifying non-paragraph lines. For example, generally only the section headers, titles, headers and footers appear in different colors as opposed to the general text.

Additionally, the page number feature may contribute in title and table of content text lines classification. Further, spacing between text lines may contribute majorly in the overall classification and detection of paragraph boundaries. Moreover, for paragraph detection, another important feature may be the parts of speech (POS) tags. For example, grammatically the beginning of paragraph, and, therefore, the beginning of a sentence may start with a set of POS. Hence, the POS tags may help in identifying if a line belongs to middle of a paragraph or at the beginning of the paragraph.

At step 404, the control logic 400 may store feature vectors for all the text lines in the database. The generated feature vectors (that is, extracted features and their corresponding values) and the tagged text lines (that is, text lines with identified structural tags) may be stored in the database. As will be appreciated, for training the model, a large number of documents may be processed, tagged, and feature vectors generated. All the values for these documents may be stored in the database, and provided as input to the machine learning model for training and learning.

At step 405, the control logic 400 may create an input matrix for each text line using the feature vectors of neighboring lines. In some embodiments, the input matrix may be created by combining feature vectors of the text line, preceding text lines, successive text lines. As will be appreciated, the feature vector may be an array of numerical feature values for each line. To create a context for each text line, the control logic 400 may concatenate this array with the arrays of previous and successive text lines (that is, feature vectors of previous and successive lines). A window size may be chosen so as to create the matrix. For example, if the window size is seven, for each text line the feature vectors of the preceding three lines and successive three lines may be padded the feature vector of the text line so as to form a matrix of row size seven.

Referring now to FIG. 5A-5D, an exemplary implementation of techniques for preparing a training data for training a machine learning model is illustrated, in accordance with some embodiments of the present disclosure. FIG. 5A illustrates an exemplary document 501. For each of the text lines in the image document 501, a structural tag may be provided to specify the class it may belong to. FIG. 5B illustrates an exemplary Json result of the structural tags 502 produced for the image document 501. It should be noted that the start tags and the end tags may specify the text line number in the page. For example, as illustrated, the line numbers from line 3 through line 4 may be tagged as 'section header' line, from line 4 through line 5 may be tagged as 'paragraph start' line, from line 5 through line 6 may be tagged as 'paragraph' line, and so forth.

Further, FIG. 5C illustrates another Json result for feature vectors 503 for the text lines. As will be appreciated, for each text line in the document, all the features values extracted may be present as a comma separated list. In some embodiments, the structural block tags of each text line may appear as the first entry in the list. This Json output, including structural tags and feature vectors for the text lines in the document, may be stored in a database. For example, considering a text line '2. STAEMENT OF COMPLIANCE' in the input document 501, and assuming that only 10 features are to be considered for generation of feature vector for the text line, the feature vector may be as below:

```
{
"2. STATEMENT OF COMPLAINCE" : "3, 65.0, 175.0,
10.942760942760943, 20.808561236623067, 212.609375,
35.792824074074076, 841.0, 594.0, 11"
}
```

Here, the first value (that is, 3) may specify structural tag of the text line (for example, section header), while the remaining 9 values may specify the feature values of the text line. The first six feature values (that is, 65.0, 175.0, 10.942760942760943, 20.808561236623067, 212.609375, and 35.792824074074076) may specify position details (that is, starting co-ordinate values, relative co-ordinate values, and end coordinate value) of the text line, and the next three feature values (that is, 841.0, 594.0, 11) may specify font details (that is, relative font weight, relative font size, and font size). It should be noted that feature vectors may typically include more feature values corresponding to additional font details (for example, color, weight, bold, italics, underline, and the like), spacing information, POS tags, length of the line (for example, number of characters in the line), and so forth.

Further, FIG. 5D illustrates another Json result for input matrix 504 for the text lines. As will be appreciated, for each text line in the document, the input matrix may be generated by concatenating feature vector of a given text line with feature vectors of previous and successive text lines. For example, considering a text line 'Arysta Lifescience U.K. Holdings Limited is a private company, limited by shares, and is incorporated and' in the input document 501, and assuming that the window size is 7, the input matrix may be as below:

```
["3,65.0,90.0,10.942760942760943,10.70154577883472,184.921875,3
1.13162878787879,841.0,594.0,11",
3,65.0,100.0,10.942760942760943,11.890606420927467,204.289062
5,34.392098063973066,841.0,594.0,11",
"3,66.0,121.0,11.11111111111111,14.3876337693222235,200.5976562
5,33.7706492003367,841.0,594.0,11",
"3,93.0,132.0,15.656565656565656,15.695600475624257,510.371093
75,85.92105955387206,841.0,594.0,11",
"2,94.0,143.0,15.824915824915825,17.00356718192628,511.1210937
5,86.04732218013469,841.0,594.0,11",
"2,94.0,153.0,15.824915824915825,18.192627824019024,195.210937
5,32.86379419191919,841.0,594.0,11",
"3,65.0,175.0,10.942760942760943,20.808561236623067,212.609375
,35.792824074074076,841.0,594.0,11" ]
```

Referring back to FIG. 4, at step 406, the control logic 400 may train a machine learning model. The inputs to the machine learning model may be in the form of input matrix generated for each text line and the corresponding structural tag for that line to train the model. The structural tag which is created manually or in a semi-supervised manner for each text line will be the expected structural class of the text line. As stated above, the structural class may include, but may not be limited to, a footnote, a paragraph starts, a paragraph line, a paragraph end, a list, a title, a table of content, or an unclassified section. Thus, each text line's tag may be one of the pre-defined structural classes. As will be appreciated, the 'un-classified' tag may possibly be associated with the text lines which do not fall into any other specific category. Examples of such 'un-classified' tag may include, but may not be limited to, signatures, OCR junk information, and the like.

The machine learning model may be a sequence to sequence machine learning model. In some embodiments, the machine learning model may be a combination of sequence-to-sequence machine learning network and position independent neural network. Initially, the input matrix may be fed into a LSTM (Long Short-Term Memory) network. The output from this network may have same dimensions as the input. As will be appreciated, this network may help build a context for each input. The output of this network may then be fed into a convolution layer. The results from the convolutional layer may be generalized so as to give the probability for each structural class.

Figure 5E:
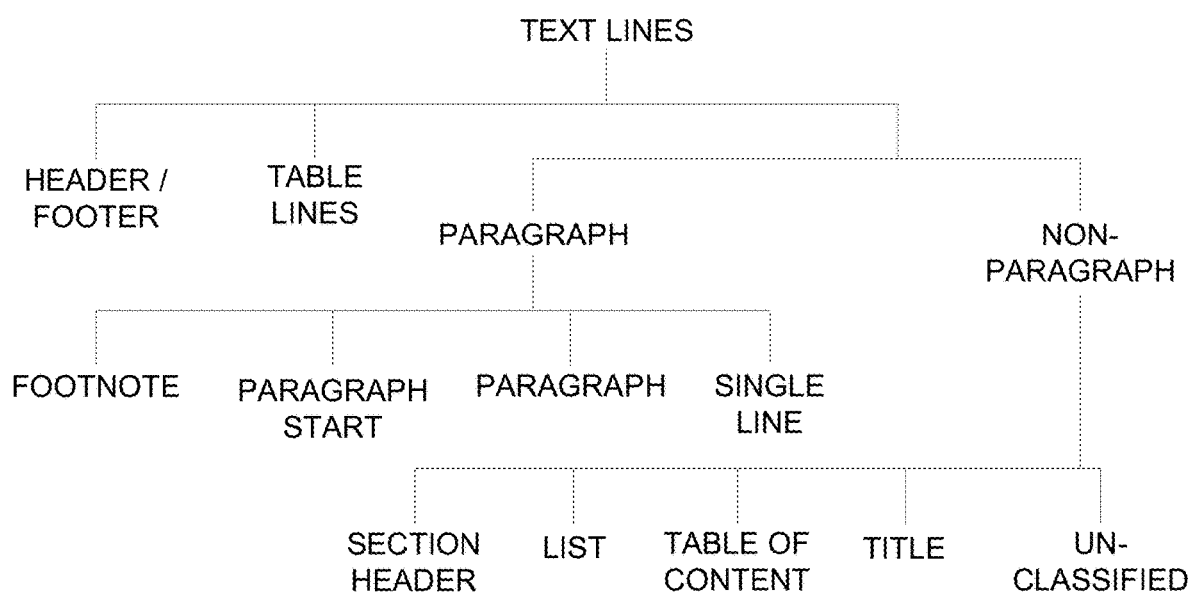

Further, it should be noted that the classification of feature data set may be done in a hierarchical way. Referring now to FIG. 5E, the text lines may be initially classified into two categories-paragraph and non-paragraph. In other words, the machine learning model may be trained as binary classifier to separate paragraph and non-paragraph text lines. The text lines classified as paragraph text lines may be further classified as footnote, paragraph start text line, paragraph text line, single text lines, and so forth. It should be noted that a single text line may refer to the text line that does not belong to any paragraph but make one complete sentence. For example, 'The following table contains the details:' may be classified as single text line. The non-paragraph text lines may be further classified into section headers, list text lines, 'table of content' text lines, title, and un-classified.

Referring back to FIG. 4, at step 407, the control logic 400 may detect and annotate structural blocks in the document using the trained model. The trained machine learning model may be tested for a document. As will appreciated, steps 401 through 405 may be performed on the test document so as to generate the input matrix for each of the text lines. The generated input matrix for each of the text lines may then be fed into the trained machine learning model to get predictions for each text line. Thus, once the machine learning model is built, the same may be employed to determine and extract or annotate the structural blocks of a document so as to identify contextual text for different input documents.

Figure 6A:
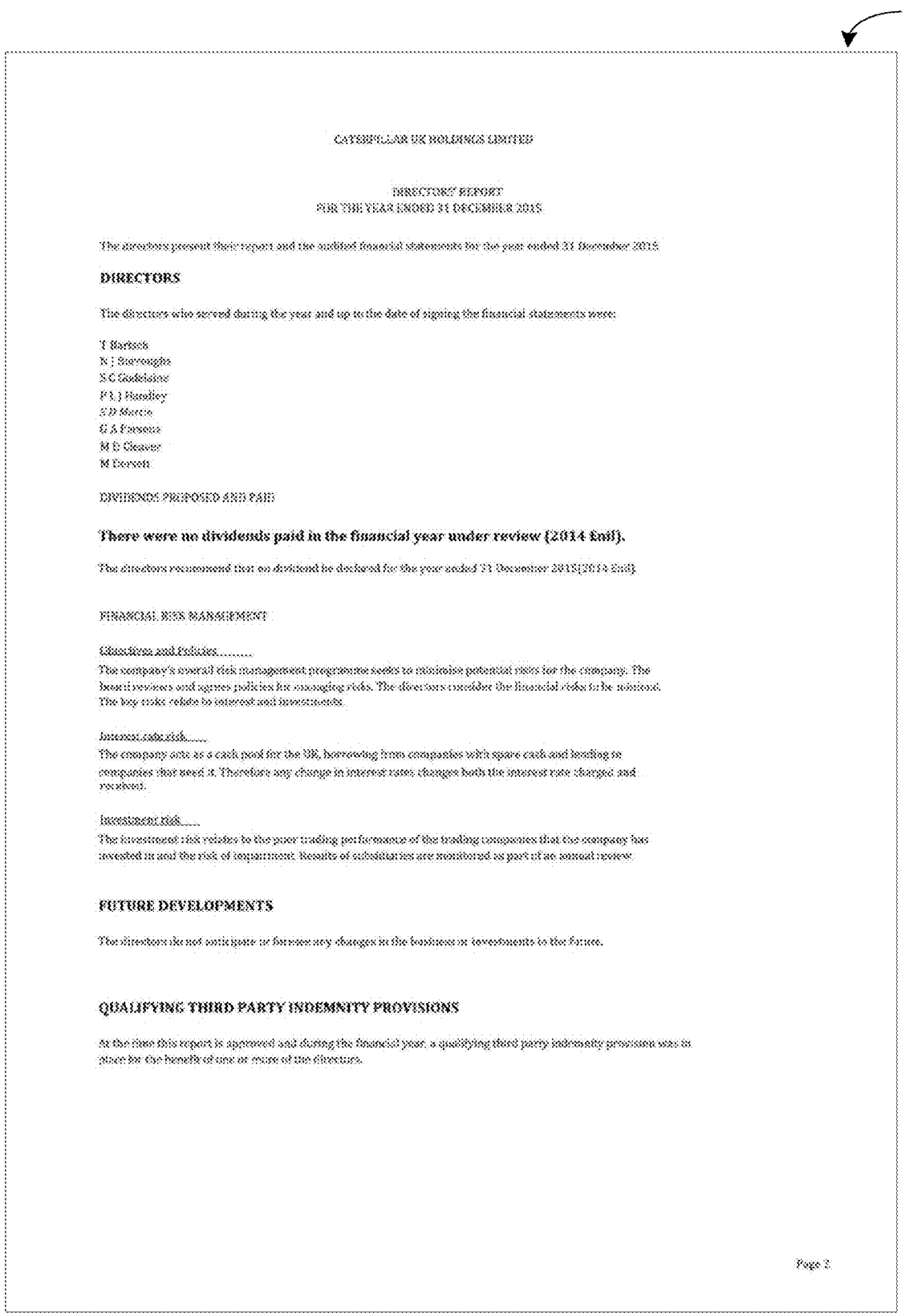
Figure 6D:
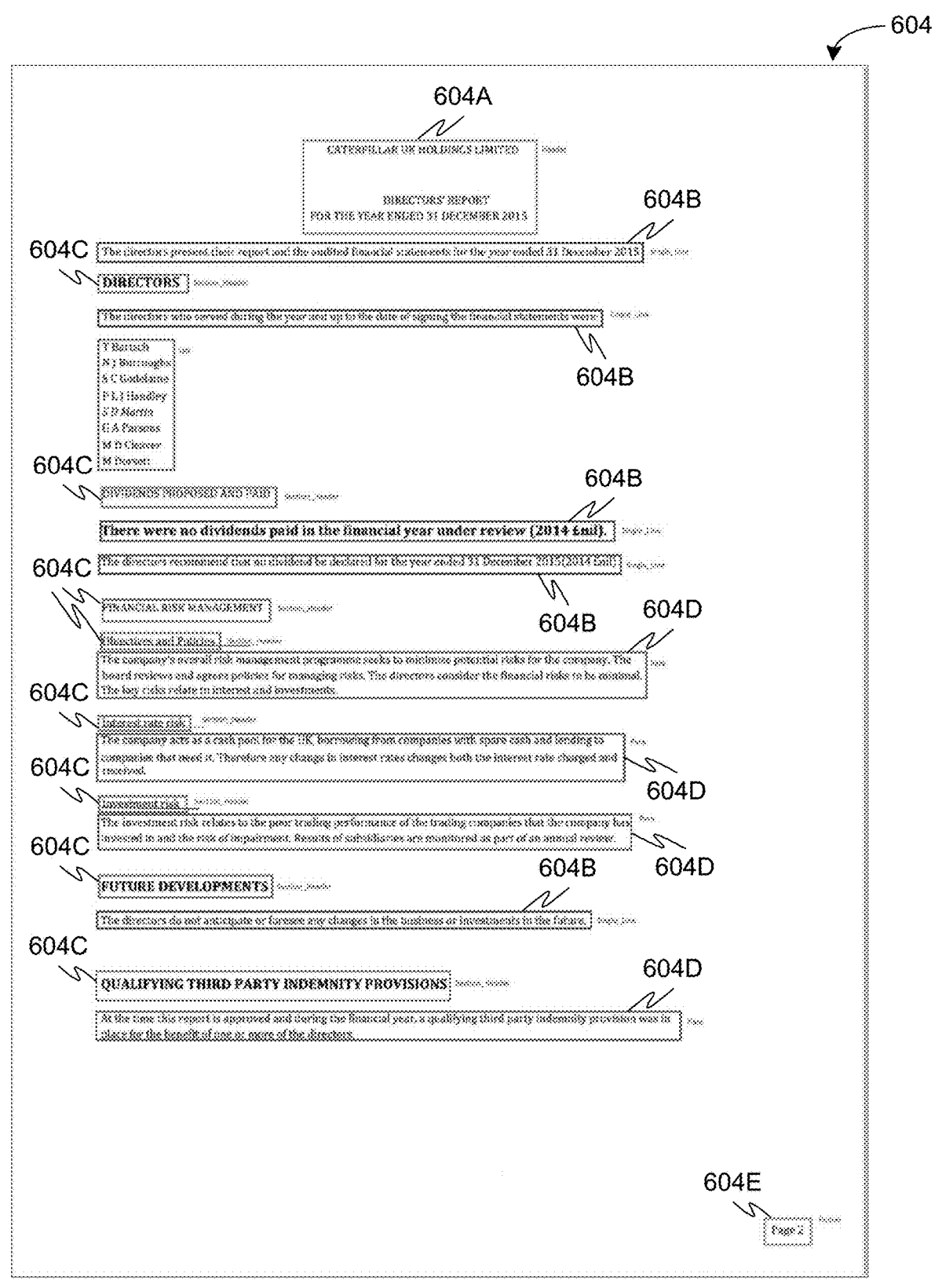

For example, referring now to FIGS. 6A-6D, an exemplary implementation of techniques for determining structural blocks of a document using a trained machine learning model is illustrated, in accordance with some embodiments of the present disclosure. FIG. 6A illustrates an exemplary document 601. FIG. 6B illustrates Json result for feature vectors 602 for the text lines of the document 601, while FIG. 6C illustrates Json result for input matrices 603 for the text lines of the document 601. Finally, FIG. 6D illustrates an annotated document 604 where each of the text lines has been classified into a structural class. As will be appreciated, 604A is a header or title of the document, 604B are single lines in the document, 604C are section headers in the document, 604D are paragraphs in the document, and 604E is a footer in the document. As will be appreciated, in some embodiments, different structural classes may be annotated using different colors.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing this technology. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing this technology. When implemented on a general-purpose microprocessor, the computer program code segments configure the microprocessor to create specific logic circuits.

Figure 7:
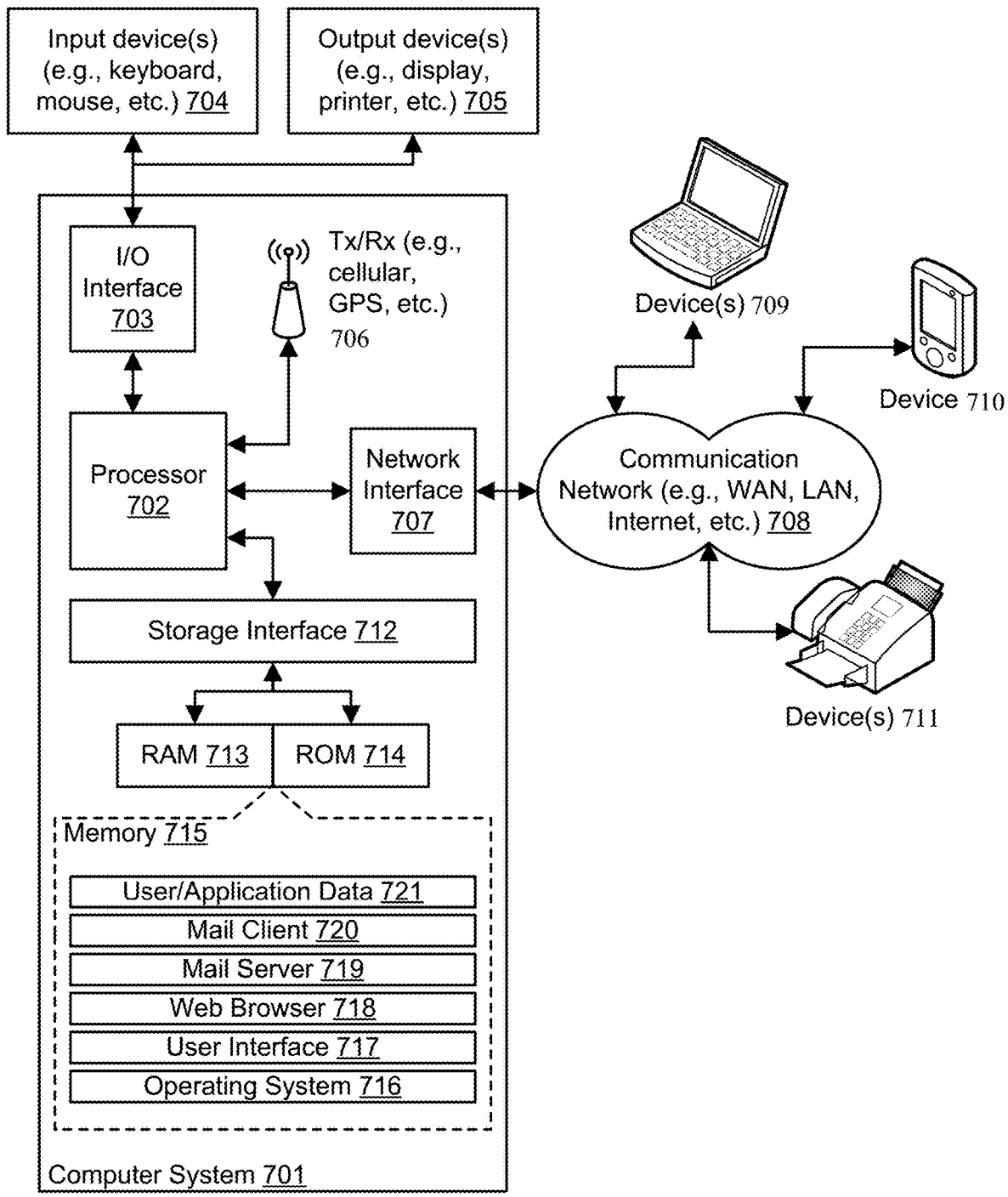
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 for determining structural blocks of a document. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., documents, extracted text, text lines, features, feature values, feature vector, input matrix, machine learning model, structural block tags, training data, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for determining and extracting structural blocks of a document using a machine learning model. The techniques may further provide for deriving the contextual data from the document. The techniques described above overcome the challenges faced in existing rule based and pattern based techniques by providing a context aware, position independent, and extensible machine learning approach to determine different structural blocks accurately and efficiently. Further, the context of each text line may be considered to perform the classification. As will be appreciated, the techniques described above does not depend on the syntactic, non-syntactic, and language modeling features. Thus, not all the conditions and scenarios are to be known to make a decision.

The techniques described in the various embodiments discussed above process and analyze the input document to detect various structural blocks present in the document (for example, paragraphs, footnote, title, section header, and the like). Based on the analyzed details, information about each line such as the co-ordinates in the page, the font details, and the like may be extracted and used as features to build a document structural blocks detection and classification model. The techniques may work across varied document types. Further, the techniques may classify sections of the documents into multiple classes and may be further extensible for additional classes. The machine learning model may be deployed easily in any cloud based servers and hence the techniques may be employed for even mobile device applications as a service.

The specification has described method and system for determining structural blocks of a document. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of determining document structural blocks, the method implemented by one or more document analysis devices and comprising:
   extracting text from a document, wherein the text comprises a plurality of text lines;
   generating a feature vector for each of the text lines, wherein the feature vectors each comprise a set of feature values for a set of corresponding features in one of the text lines;
   creating an input matrix for each of the text lines, wherein the input matrices each comprise a set of feature vectors corresponding to a set of neighboring ones of the text lines along with one of the text lines; and
   determining a structural block tag for each of the text lines based on the corresponding one of the input matrices using a machine learning model.

2. The method of claim 1, further comprising:
   receiving an image document;
   performing an optical text recognition on the image document to generate the document; and
   applying a text extraction tool with a pre-defined or a dynamic threshold on the document to extract the text lines from the document.

3. The method of claim 1, wherein at least one of:
   the set of corresponding features comprise at least one of a positional feature, a font feature, a count feature, a spacing feature, or a semantic feature; or
   the set of feature values comprises at least one of one or more positional coordinates, a font size, a font weight, a font relative weight, one or more flags for one or more font styles, or a length.

4. The method of claim 1, wherein the set of neighboring text lines comprises a pre-defined set of preceding text lines and a pre-defined set of successive text lines.

5. The method of claim 1, wherein the structural block tag comprises a paragraph tag or a non-paragraph tag, wherein the paragraph tag comprises one of a footnote tag, a paragraph start tag, a single line tag, or a paragraph tag, and wherein the non-paragraph tag comprises one of a section header tag, a list tag, a table of content tag, a title tag, or an un-classified tag.

6. The method of claim 1, wherein the machine learning model is a sequence to sequence machine learning model and the method further comprises training the machine learning model with training data, wherein the training data comprises a set of texts extracted from a set of documents, and, for each of the set of texts, a set of text lines with a corresponding set of feature vectors and a corresponding set of pre-defined structural block tags.

7. A document analysis device, comprising a non-transitory computer readable medium having programmed instructions stored thereon and a processor configured for being communicatively coupled with the non-transitory computer readable medium and further configured to execute the stored programmed instructions to:
   extract text from a document, wherein the text comprises a plurality of text lines;
   generate a feature vector for each of the text lines, wherein the feature vectors each comprise a set of feature values for a set of corresponding features in one of the text lines;
   create an input matrix for each of the text lines, wherein the input matrices each comprise a set of feature vectors corresponding to a set of neighboring ones of the text lines along with one of the text lines; and
   determine a structural block tag for each of the text lines based on the corresponding one of the input matrices using a machine learning model.

8. The document analysis device of claim 7, wherein the processor is further configured to execute the stored programmed instructions to:
   receive an image document;
   perform an optical text recognition on the image document to generate the document; and
   apply a text extraction tool with a pre-defined or a dynamic threshold on the document to extract the text lines from the document.

9. The document analysis device of claim 7, wherein at least one of:
   the set of corresponding features comprise at least one of a positional feature, a font feature, a count feature, a spacing feature, or a semantic feature; or
   the set of feature values comprises at least one of one or more positional coordinates, a font size, a font weight, a font relative weight, one or more flags for one or more font styles, or a length.

10. The document analysis device of claim 7, wherein the set of neighboring text lines comprises a pre-defined set of preceding text lines and a pre-defined set of successive text lines.

11. The document analysis device of claim 7, wherein the structural block tag comprises a paragraph tag or a non-paragraph tag, wherein the paragraph tag comprises one of a footnote tag, a paragraph start tag, a single line tag, or a paragraph tag, and wherein the non-paragraph tag comprises one of a section header tag, a list tag, a table of content tag, a title tag, or an un-classified tag.

12. The document analysis device of claim 7, wherein the machine learning model is a sequence to sequence machine learning model and the processor is further configured to execute the stored programmed instructions to train the machine learning model with training data, wherein the training data comprises a set of texts extracted from a set of documents, and, for each of the set of texts, a set of text lines with a corresponding set of feature vectors and a corresponding set of pre-defined structural block tags.

13. A non-transitory computer readable medium having stored thereon instructions for determining document structural blocks comprising executable code which when executed by one or more processors, causes the processors to:
   extract text from a document, wherein the text comprises a plurality of text lines;
   generate a feature vector for each of the text lines, wherein the feature vectors each comprise a set of feature values for a set of corresponding features in one of the text lines;
   create an input matrix for each of the text lines, wherein the input matrices each comprise a set of feature vectors corresponding to a set of neighboring ones of the text lines along with one of the text lines; and
   determine a structural block tag for each of the text lines based on the corresponding one of the input matrices using a machine learning model.

14. The non-transitory computer readable medium of claim 13, wherein the executable code when executed by the processors further causes the processors to:
   receive an image document;
   perform an optical text recognition on the image document to generate the document; and
   apply a text extraction tool with a pre-defined or a dynamic threshold on the document to extract the text lines from the document.

15. The non-transitory computer readable medium of claim 13, wherein at least one of:
   the set of corresponding features comprise at least one of a positional feature, a font feature, a count feature, a spacing feature, or a semantic feature; or
   the set of feature values comprises at least one of one or more positional coordinates, a font size, a font weight, a font relative weight, one or more flags for one or more font styles, or a length.

16. The non-transitory computer readable medium of claim 13, wherein the set of neighboring text lines comprises a pre-defined set of preceding text lines and a pre-defined set of successive text lines.

17. The non-transitory computer readable medium of claim 13, wherein the structural block tag comprises a paragraph tag or a non-paragraph tag, wherein the paragraph tag comprises one of a footnote tag, a paragraph start tag, a single line tag, or a paragraph tag, and wherein the non-paragraph tag comprises one of a section header tag, a list tag, a table of content tag, a title tag, or an un-classified tag.

18. The non-transitory computer readable medium of claim 13, wherein the machine learning model is a sequence to sequence machine learning model and the executable code when executed by the processors further causes the processors to train the machine learning model with training data, wherein the training data comprises a set of texts extracted from a set of documents, and, for each of the set of texts, a set of text lines with a corresponding set of feature vectors and a corresponding set of pre-defined structural block tags.

* * * * *